United States Patent [19]

Petersen

[11] Patent Number: 5,085,400
[45] Date of Patent: Feb. 4, 1992

[54] VALVE

[75] Inventor: Hans C. Petersen, Nordborg, Denmark

[73] Assignee: Danfoss A/S, Nordborg, Denmark

[21] Appl. No.: 706,001

[22] Filed: May 28, 1991

[30] Foreign Application Priority Data

Jul. 6, 1990 [DE] Fed. Rep. of Germany ....... 4021580

[51] Int. Cl.⁵ .............................................. F16K 31/02
[52] U.S. Cl. ................................ 251/129.06; 137/508; 137/596.17; 137/625.61; 137/625.66
[58] Field of Search ............. 137/508, 596.17, 625.61, 137/625.66; 251/129.06; 91/462

[56] References Cited

U.S. PATENT DOCUMENTS

| | | | |
|---|---|---|---|
| 3,052,259 | 9/1962 | van der Velden | 137/508 X |
| 3,465,732 | 9/1969 | Kattohee | 251/129.06 X |
| 4,082,104 | 4/1978 | Keeney | 137/508 X |

Primary Examiner—Arnold Rosenthal
Attorney, Agent, or Firm—Wayne B. Easton; Clayton R. Johnson

[57] ABSTRACT

A stepped piston is axially displaceable in the stepped piston valve chamber and has a front face facing the front face of the valve seat and an axially opposite surface formed at the juncture of its piston head portion to its reduced diameter shaft portion. The piston has an axial through-bore that opens to fluid connecting bore in the valve housing while the housing has a second fluid connecting bore. The piston is displaceable in the chamber between an open position permitting substantial fluid flow between the connecting bores and a closed position having its front face resting against the valve seat face to permit a leakage flow gap between the faces when pressurized fluid acts against the piston surface and block substantial fluid flow between the first bore and the second bore. A spring in the chamber urges the piston toward its closed position. An insert deformable under a physical parameter, for example made of one of a piezo-electric material and a magnetostrictive material, is arranged in one of the front faces such that the gap is enlarged when the insert contracts the pressure on the piston front face changes and the piston moves from one of its position to the other. One of the connecting bores is an outlet bore and the other is pressurized fluid inlet.

11 Claims, 6 Drawing Sheets

VALVE

The invention relates to a valve having a piston and a valve seat, in which the piston rests, in the closed position, with a front face against a front face of the valve seat and, when a pressurised fluid is supplied to the valve inlet, a leakage flow occurs between the front faces and at the same time the pressurised fluid acts upon a portion of the piston surface facing away from the front face of the piston.

In change-over valves of that type it is known that inaccurate manufacture or cracks that form during operation can reduce the areas of contact of the front faces of the piston and the valve seat to such an extent that the piston is displaced relative to the valve seat and the valve opens. That is, however, undesirable.

The problem on which the invention is based is to provide a valve of the type according to the precharacterising clause in which the piston is displaced in the opening direction only when this is required.

This problem is solved according to the invention as follows: arranged in one of the front faces of the valve seat and the piston is an insert that is deformable, by supplying a physical parameter, in such a manner that the gap between the front faces is enlarged at least over a portion of the front faces, and a spring is provided that presses against the piston in the direction towards the closed position.

When, in the case of that solution, the insert is deformed by supplying a physical parameter, the piston is displaced in the opening direction as a function of the direction of flow of the pressurised fluid through the valve. There is therefore the option of opening or closing the valve by supplying or taking away the physical parameter, according to the choice of direction of flow of the pressurised fluid through the valve.

A simple form of that valve may be as follows: the piston is of stepped diameter and has a shaft portion passing in sealed relation through a relatively narrow portion of a stepped housing bore and has a head portion received with a radial spacing in an enlarged portion of the housing bore, the shaft portion being axially displaceable in the relatively narrow portion and the head portion being axially displaceable in the enlarged portion of the housing bore; the piston has an axial through-bore that is connected to a first connecting bore that passes through the housing wall, and the housing has a second connecting bore that is connected to the enlarged portion of the housing bore.

The insert may be simply a ring surrounding the second connecting bore. In that way there is a uniform distribution of pressure also between the insert and the piston.

The face of the insert facing the piston may then be smaller than the front face of the piston. In that case, a relatively small amount of material is needed for the insert.

In that case, the outside diameter of the insert may be larger than that of the piston. In that case, the front face of the insert facing the piston is yet smaller than the front face of the piston. Nevertheless, relatively large forces can be exerted between the insert and the piston because those forces are effective over a very large edge region of the front face of the piston. Correspondingly large changes in the ratio of the opposing forces acting upon the piston can be exerted as a function of the deformation of the insert, with the result that reliable switching of the valve is ensured even when the pressure of the pressurised fluid is low.

Alternatively, it can be ensured that the outside diameter of the insert is smaller than that of the head portion of the piston and the inside diameter of the insert is the same as the diameter of the piston bore. In that embodiment, a very small amount of material is needed for the insert.

A further alternative can be for the outside diameter of the insert to be the same as that of the head portion of the piston and the inside diameter of the insert to be the same as the diameter of the piston bore. In that embodiment, although the amount of material used for the insert is relatively large, only a very low pressurised fluid pressure is required, owing to the relatively large surface area between insert and piston.

Furthermore, the insert may be in the form of a disk that has on the side of the piston a conical recess concentric with the piston axis, and the piston bore may have a narrowing for throttling through-flow. In the case of that valve the through-flow can be adjusted constantly as a function of the quantity of the physical parameter supplied: When the pressurised fluid is supplied a drop in pressure occurs at the throttling narrowing which drop tends to press the piston against the valve seat. As the valve opening increases, the through-flow, and hence the pressure drop at the narrowing, increases. The forces acting in the through-flow direction increase accordingly. This produces an equilibrium at an intermediate position of the piston that depends on the degree of deformation of the insert.

The insert may consist of a piezo-electric or a magnetostrictive material. Those materials can be deformed in a simple manner by applying a physical parameter in the form of an electrical voltage or a magnetic field. It is, however, also possible to select an insert material that can be deformed by means of direct or indirect heating. A "shape-memory" metal would be advantageous.

The invention and its developments are described in detail below with reference to drawings of preferred embodiments and exemplary applications.

Figure 1:
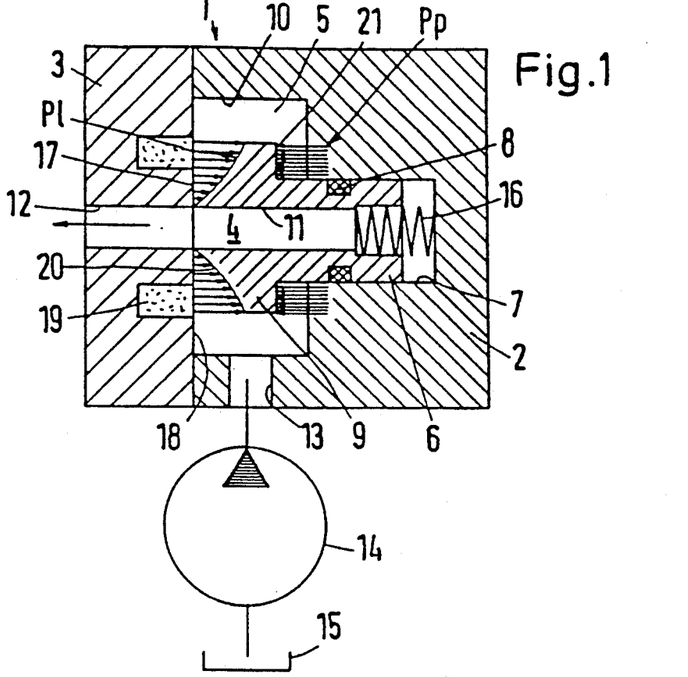
FIG. 1 is a cross-sectional view of a first embodiment of a valve according to the invention in a closed state.

The valve according to FIG. 1 has a housing 1 consisting of a housing part 2 and a cover 3. Mounted in the housing part 2 in such a manner that it is axially displaceable is a piston 4 of stepped diameter that acts as a valve-closure member. The cover 3 in this case forms the valve seat. The piston of stepped diameter has a shaft portion 6 which passes through a relatively narrow portion 7 of the housing bore 5 in such a manner that it is sealed against the housing bore 5 by means of a sealing ring, and has a head portion 9 which is received with a radial spacing in an enlarged portion 10 of the housing bore 5. The piston 4 also has an axial through-bore 11 which is connected coaxially to a first connecting bore 12 that passes through the housing wall, in this case the cover 3. In addition, the housing 1 has in the housing portion 2 a second connecting bore 13 which is connected to the enlarged portion 10 of the housing bore 5. A load can be connected to the first connecting bore 12 and, to the second connecting bore 13, the pressure side of a pump 14 for a fluid, in this case a liquid contained in a supply container 15, can be connected.

A spring 16 has one end bearing on the base of the portion 7 of the housing bore and the other end bearing on a shoulder of a step in the bore 11 formed in the shaft portion 6 of the piston 4. The spring 16 presses the front face 17 of the piston 4 against the front face 18 of the valve seat 3, that is to say in the direction towards the closed position.

Figure 2:
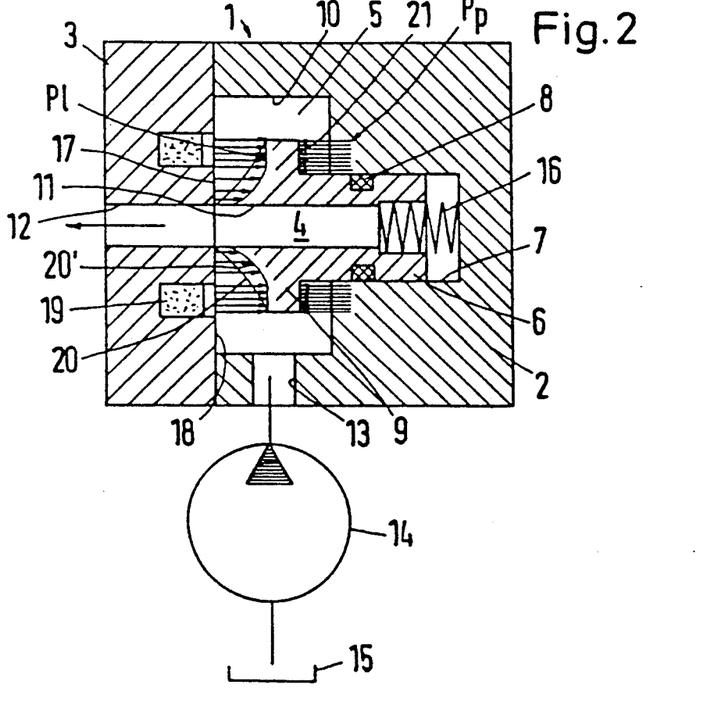
FIG. 2 shows the valve according to FIG. 1 in an open state.

Arranged in an annular groove in the front face 18 of the valve seat 3 is an insert 19, in the form of a ring, that surrounds the first connecting bore 12. The insert 19 comprises a piezo-electric material, with the result that it is deformable, by supplying a physical parameter, in this case by applying an electrical voltage, in such a manner that by contracting axially, as shown in FIG. 2, it enlarges the gap between the front faces 17 and 18 over a portion of the front faces.

Instead of a piezo-electric material, it is also possible to use a magnetostrictive material or another, for example a thermally deformable, material.

The face of the insert 19 facing the piston 4 is smaller than the front face 17 of the piston 4. The outside diameter of the insert 19 is larger than that of the piston 4. The inside diameter of the insert 19 is accordingly smaller than the outside diameter of the piston 4, but larger than the inside diameter of the piston 4, with the result that the front faces of piston 4 and insert 19 overlap.

Before an electrical voltage is applied to the insert 19, the latter has the shape shown in FIG. 1 in which its front face is in the same plane as the front face 18 of the valve seat. When the pump 14 is switched on, it supplies a pressurised fluid by way of the connecting bore 13 to the intermediate space between the piston 4 and the bore portion 10. Although the spring 16 presses the front face 17 of the piston 4 against the front face 18, a leakage flow can occur between the front faces 17 and 18 to the connecting bore 12 on the outlet side. The pressure P1 of the pressurised fluid decreases radially from the outside to the inside in the gap between the front faces 17 and 18, in accordance with the curve 20, from its starting value $P_p$ virtually to zero. The size ratio of the front face 17 of the piston 4 to the surface 21 of the head portion 9 facing away from the front face 17 of the piston 4 is, however, so selected that the spring force F acting upon the piston 4 and the pressurised fluid force $P_p \times A$—A being the area of the surface 21—acting upon the surface 21 are together greater than the integral of the pressing forces acting upon the front face 17 of the piston 4, that is to say $$P_p \times A + F > \int_{R_i}^{R_a} P1 \times da,$$

wherein $R_i$ is the inside radius and $R_a$ the outside radius of the front face 17 of the head portion 9.

The forces exerted on the piston in the closing direction therefore outweigh the forces acting upon the piston 4 in the opening direction, with the result that the valve remains closed.

If, however, an electrical voltage is applied to the insert 19, the insert becomes deformed by contracting axially and assumes the position shown in FIG. 2, in which the contact surfaces between piston 4 and valve seat 3 are reduced to such an extent that the characteristic curve 20', shown in FIG. 2, of the pressure P1 acting upon the front face 17 of the piston 4 results. In that case, the same pressure $P_p$ acts in the region of the front face of the insert 19 both in the opening direction and in the closing direction, while the size of the annular surface of the valve seat 3 lying radially within the insert 19 and facing the piston 4 is selected so that the fluid pressure forces acting upon that annular surface are greater than the force F of the spring 16. In that case $$P_p \times A + F < \int_{R_i}^{R_a} P1 \times da$$

applies. The valve is therefore opened.

In a modification of the embodiment shown in FIGS. 1 and 2, it is also possible to reverse the flow direction of the fluid through the valve. In that case, however, the valve is closed when the insert 19 in accordance with FIG. 2 is deformed.

Figure 3:
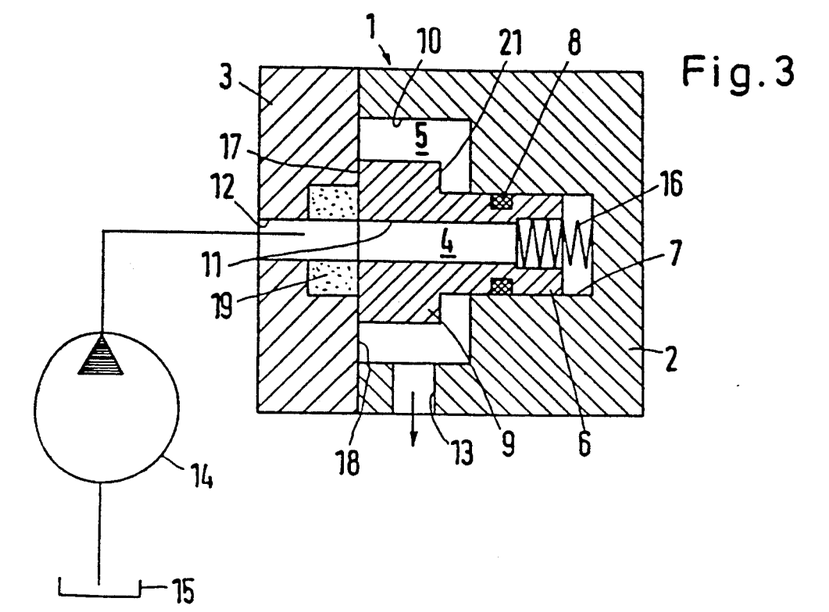
FIG. 3 is a cross-section through a second embodiment of a valve according to the invention.

The valve according to FIG. 3 differs from the valve according to FIGS. 1 and 2 firstly in that the outside diameter of the insert 19 is smaller than that of the head portion 9 of the piston 4 and the inside diameter of the insert 19 is the same as the diameter of the piston bore 11 or the inside diameter of the piston 4, and secondly in that the through-flow direction is reversed, that is to say the pressure side of the pump 14 is connected to the first connecting bore 12. In this form of annular insert 19 the amount of material used for the insert 19 is smaller than in the case of the embodiment according to FIGS. 1 and 2. The mode of operation, on the other hand, is the same as in the embodiment according to FIGS. 1 and 2: Before a voltage is applied to the insert 19, that is to say when the insert 19 has the shape shown, the forces exerted on the front face of the shaft portion 6 by the pressurised fluid and the spring 16 outweigh the pressing forces exerted by the leakage flow between the front faces 17 and 18, with the result that the valve remains closed. If, however, a voltage is applied to the insert 19, the latter contracts axially, as shown in FIG. 2, with the result that the gap in the region of the insert between the front faces 17 and 18 becomes enlarged and in that region the same pressure is exerted on the front face 17 as on the front face of the shaft portion 6. The ratios of the faces are so selected that the pressing forces exerted on the surface region of the front face 17 lying radially outside the insert 19 are greater than the spring force F, with the result that the valve opens.

Figure 4:
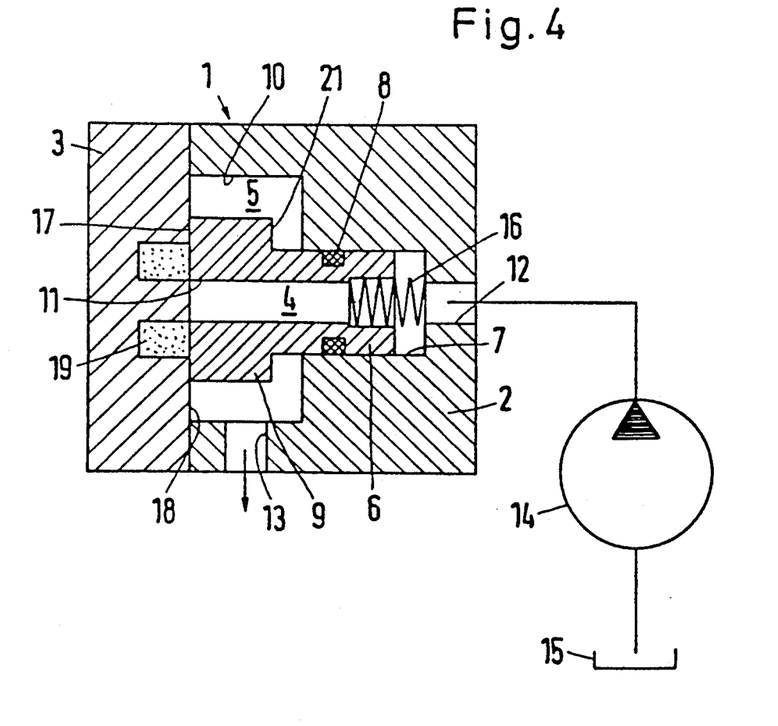
FIG. 4 is a cross-section through a third embodiment of a valve according to the invention.

The valve according to FIG. 4 differs from the valve according to FIG. 3 only in that the first connecting bore 12 passes through the base of the bore 5 or of the bore portion 7. The mode of operation, on the other hand, is the same as that of the valve according to FIG. 3.

Figure 5:
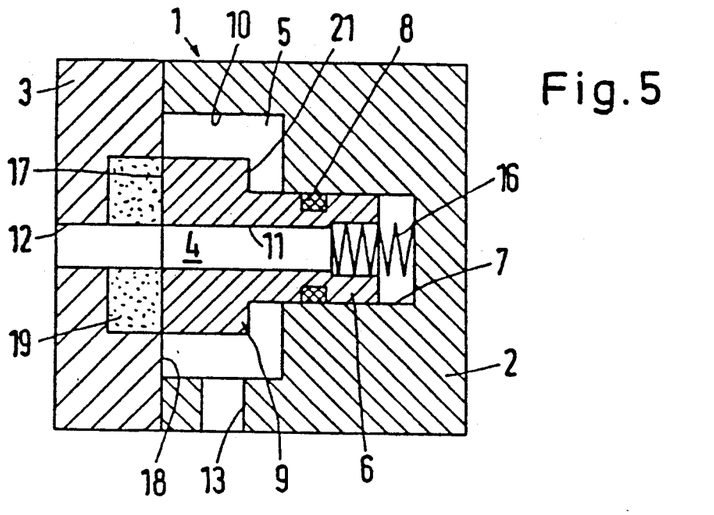
FIG. 5 is a cross-section through a fourth embodiment of a valve according to the invention.

The valve according to FIG. 5 differs from those described above only in that the outside diameter of the insert 19 is the same as that of the head portion 9 of the piston 4 and the inside diameter of the insert 19 is the same as the diameter of the piston bore 11. In the case of that valve—while the other dimensions are the same as those of the valves according to FIGS. 1 to 4—a relatively low pump pressure is required in order to open the valve when the operating voltage of the insert 19 is switched on, regardless of whether the pressure side of the pump is connected to the first connecting bore 12 or the second connecting bore 13.

The valves according to FIGS. 1 to 5 do not close again until the through-flow of pressurised fluid is interrupted, for example until the pump 14 is switched off, and regardless of whether a voltage continues to be applied to the insert 19.

Figure 6:
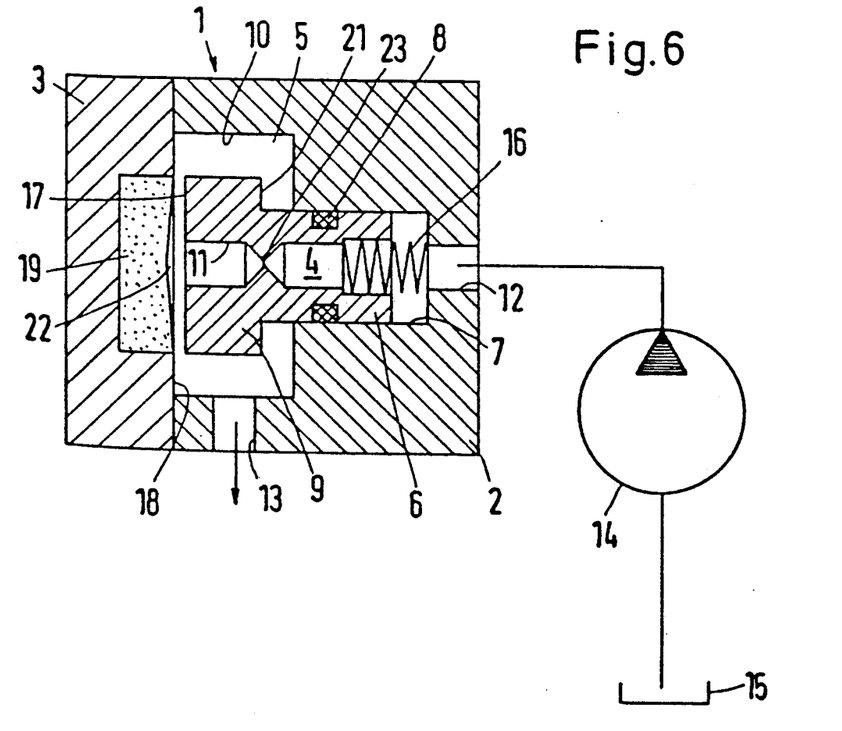
FIG. 6 is a cross-section through a fifth embodiment of a valve according to the invention.

The valve according to FIG. 6 differs from the valve according to FIG. 5 only in that firstly the first connecting bore 12 passes through the base of the bore 5 in the housing portion 2 and the insert 19 is in the form of a disk that has, on the side of the piston 4, a conical recess 22 concentric with the piston axis, and the piston bore 11 has a narrowing 23 for throttling through-flow. In that embodiment the cross-section of the opening of the valve, and hence the through-flow, is constantly adjustable. When the pump 14, the pressure side of which is connected to the first connecting bore 12, is switched on, the pressure drop at the narrowing 23 produces a force that presses the piston 4 against the front face 18 of the valve seat. As the opening of the valve increases, the through-flow, and with it the pressure drop at the narrowing 23, also increases. As a consequence, the forces that tend to close the valve also increase. This results in an equilibrium of forces at an intermediate position of the piston 4 that depends on the degree of deformation of the insert 19 and hence on the level of the voltage applied. By altering the voltage applied, therefore, the through-flow can be adjusted.

Figure 7:
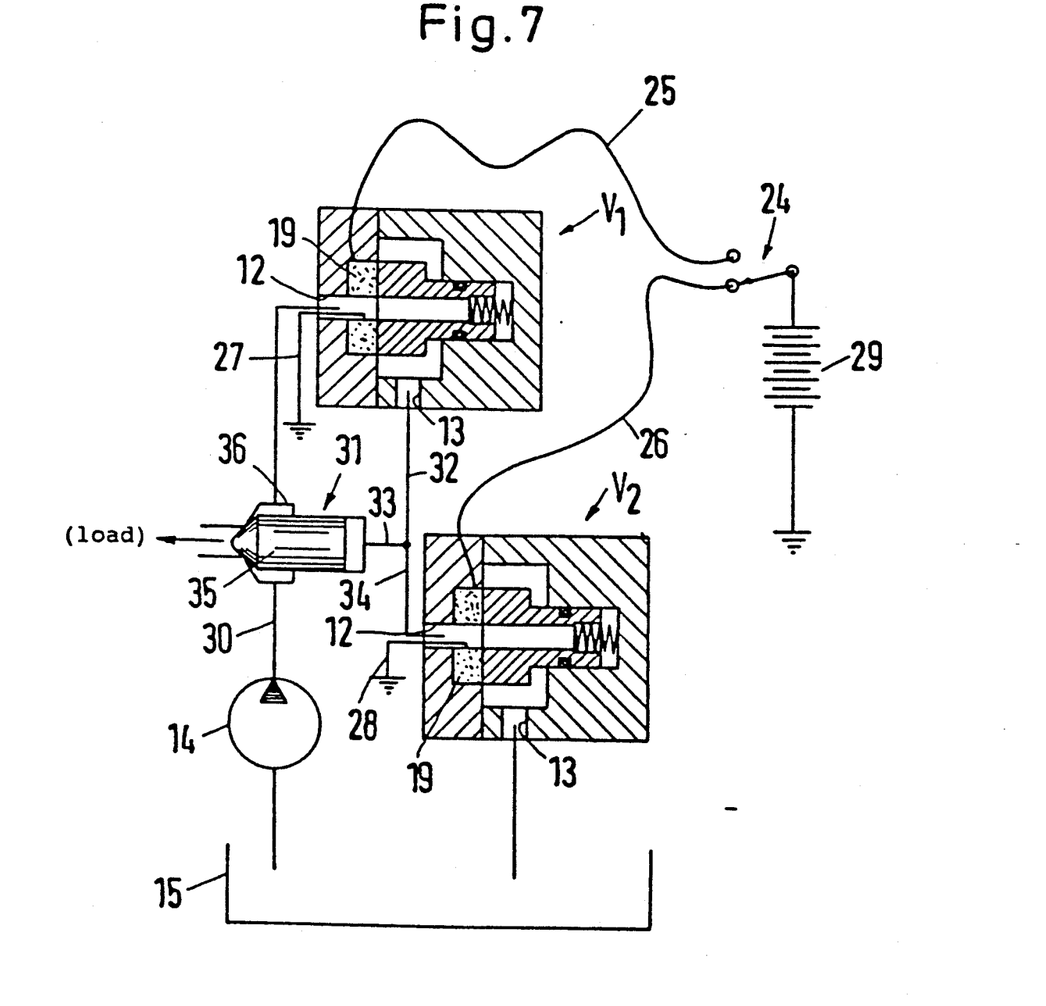
FIG. 7 shows an exemplary application for two valves according to FIG. 5.

FIG. 7 shows an exemplary application for two valves $V_1$ and $V_2$ for switching on and off the supply of a pressurised fluid to a load (not shown). By way of a change-over switch 24 and electrical supply lines 25, 26 and return lines 27, 28, the voltage from a direct-current source 29 can be applied either to the insert 19 of the valve $V_1$ or to the insert 19 of the valve $V_2$. In a pressure supply line 30 leading from the pump 14 to the first connecting bore 12 of the valve $V_1$ is a conventional valve 31, which is connected on the outlet side to the load and on the actuating side by way of fluid lines 32, 33, 34 on the one hand to the second connecting bore 13 of the valve $V_1$ and on the other to the first connecting bore 12 of the second valve $V_2$. It has a closure member 35 that is axially displaceable in a housing 36.

When the switch 24 is in the position shown, the valve $V_1$ is closed and the valve $V_2$ is open. The closure member 35 is therefore lifted from the valve seat by the pressurised fluid supplied by the pump 14, return flow taking place by way of the lines 33 and 34 and the valve $V_2$ to the supply container 15, and the pressurised fluid being supplied to the load by way of the opened valve 31, since the valve $V_1$ is closed. When the switch 24 is in the other position, the through-flow of the pressurised fluid from the pump 14 to the load is blocked.

Figure 8:
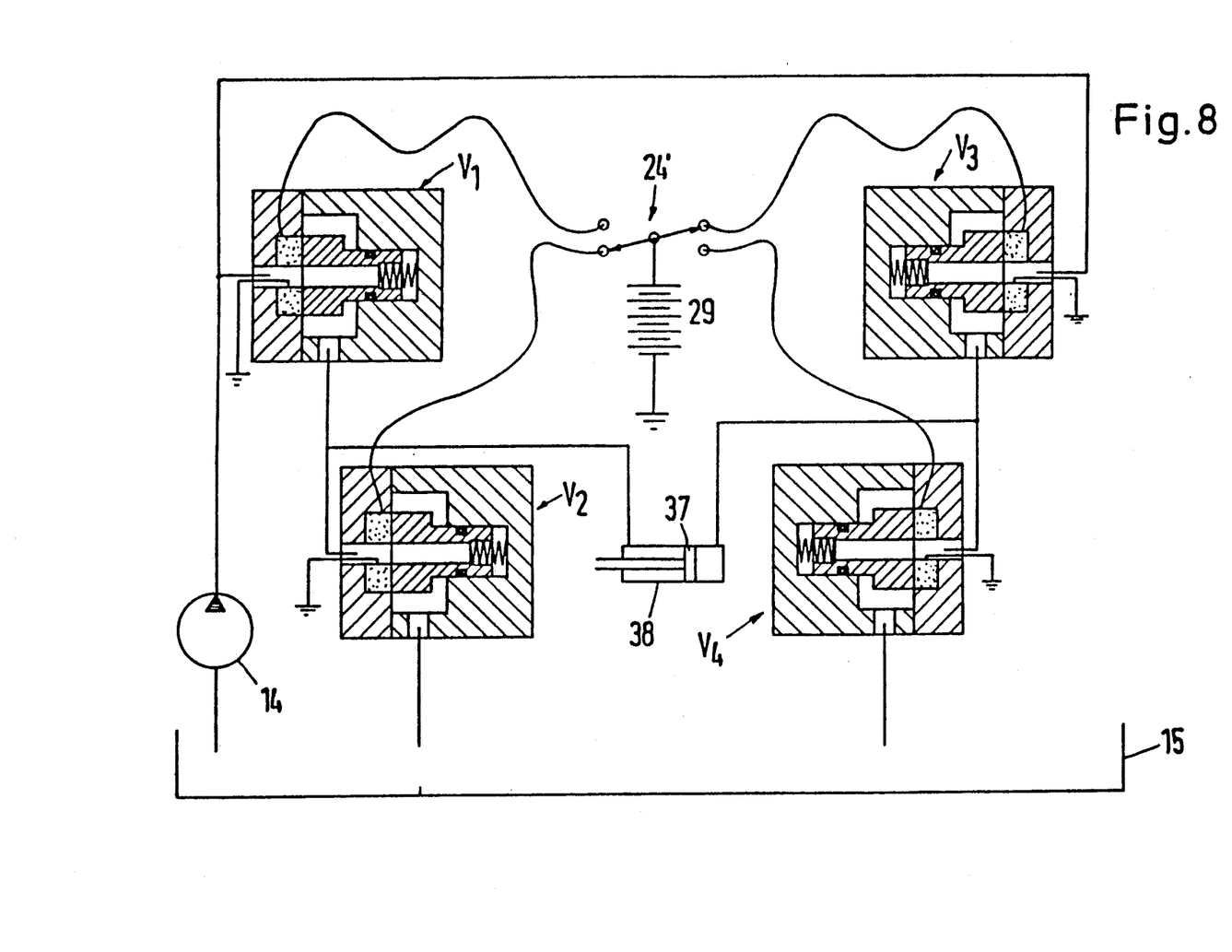
FIG. 8 shows a further exemplary application for valves according to FIG. 5.

FIG. 8 shows a further exemplary application for a valve according to FIG. 5, four such valves $V_1$ to $V_4$ being used to control the position of a piston 37 in a cylinder 38. When the change-over switch 24' is in the position shown, the valves $V_1$ and $V_4$ are closed, whereas the valves $V_2$ and $V_3$ are open. The pressurised fluid therefore passes from the pump 14 by way of the valve $V_3$ into the right-hand chamber of the cylinder 38 and displaces the piston 37 to the left, the return flow taking place from the left-hand chamber of the cylinder 38 by way of the valve $V_2$ into the supply container 15. On the other hand, when the change-over switch 24' is in the other position (not shown), the valves $V_1$ and $V_4$ are open and the valves $V_2$ and $V_3$ are closed, with the result that the pressurised fluid from the left-hand chamber of the cylinder 38 is supplied by way of the valve $V_1$ and the piston 37 is displaced to the right, a return flow taking place from the right-hand chamber of the cylinder 38 by way of the valve $V_4$ to the supply container 15.

Figure 9:
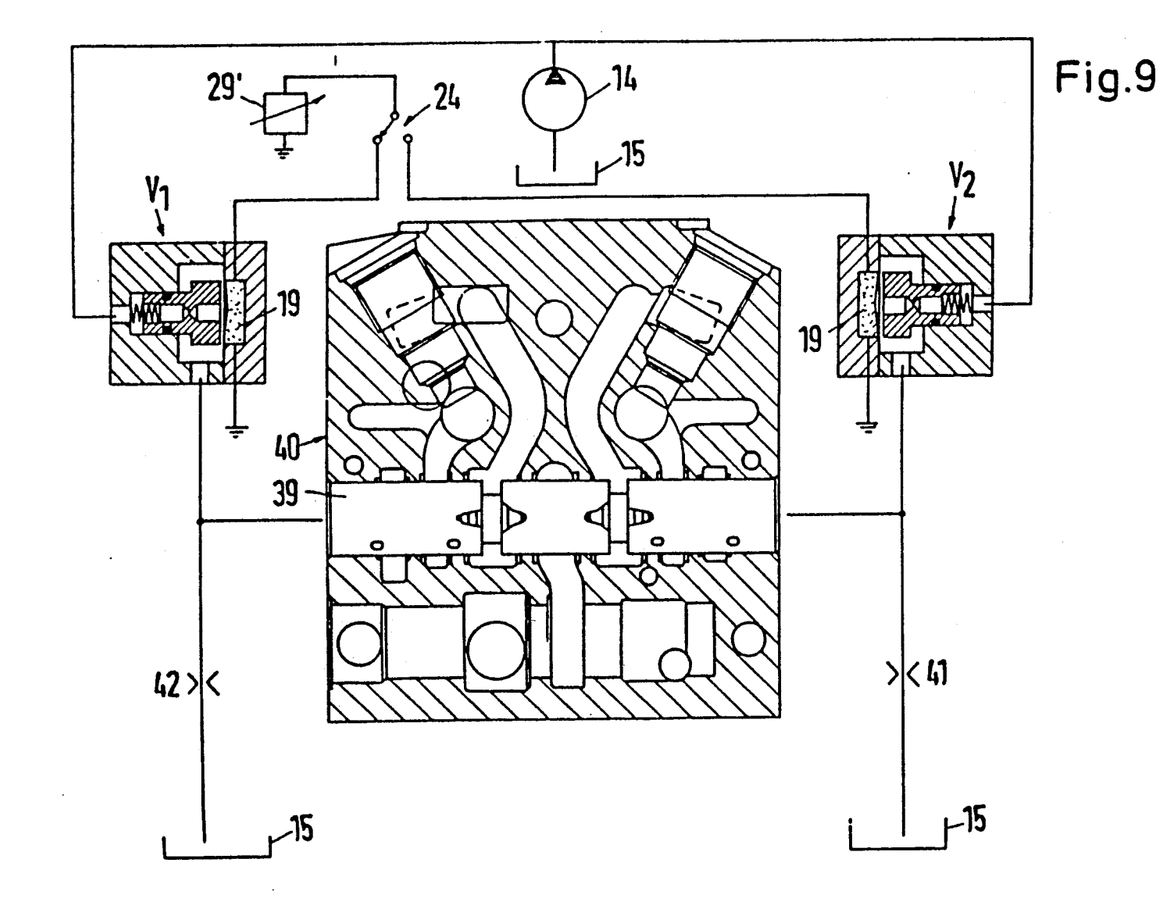
FIG. 9 shows an exemplary application for two valves according to FIG. 6.

FIG. 9 shows an exemplary application for two valves $V_1$ and $V_2$ according to FIG. 6 for adjusting the position of an axial slider 39 in a conventional proportional valve 40. When the change-over switch 24 is in the position shown, the insert 19 of the valve $V_1$ is connected to a voltage from an adjustable voltage source 29', with the result that the valve $V_1$ is opened to an extent corresponding to the level of the voltage applied, while the valve $V_2$ is closed. The pressurised fluid from the pump 14 is therefore supplied by way of the valve $V_1$ to the left-hand pressure side of the axial slider 39 with the result that the latter is displaced to the right and at the same time a return flow takes place from the right-hand pressure side of the axial slider 39 by way of a throttle point 41 and from the outlet side of the valve $V_1$ by way of a second throttle point 42 into the supply container 15. When the switch 24 is changed over, the axial slider 39 is accordingly displaced to the left.

What is claimed is:

1. A valve for controlling the flow of pressurized fluid comprising a valve housing having an axially extending piston chamber, a first fluid connecting bore opening to the chamber and a second fluid connecting bore opening to the chamber, a valve seat having a front face, a piston having a front face, a piston surface facing away from the piston front face for pressurized fluid acting thereagainst, and being movable in the chamber between an open position and a closed position having its front face resting against the valve seat face to permit a leakage flow gap between the faces when pressurized fluid acts against the piston surface and substantially block fluid flow between the first bore and the second bore, an insert mounted in the front face of one of the piston and the valve seat that is deformable by supplying a physical parameter to enlarge the gap between the faces, and a spring in the piston chamber for urging the piston toward the piston closed position.

2. A valve according to claim 1, characterized in that the insert is made of a one a piezo-electric material and a magnetostrictive material.

3. A valve according to claim 1, characterized in that the piston has a piston axis, and that the insert is a disk having a conical recess concentric with the piston axis and adjacent to the piston front face.

4. A valve according to claim 1, characterized in that the piston chamber is of an axially stepped diameter to have a first diametric bore portion and a reduced diametric portion axially opposite of the front faces from the first diametric portion, that the piston is of a stepped diameter and has a shaft portion axially displaceable in the reduce diameter portion in sealing relationship thereto and a head portion of a larger diameter than the shaft portion and being axially displaceable in the first diametric portion, and that the piston has an axial through-bore that is fluidly connected with first connecting bore and that the second connecting bore opens to the first diametric bore portion.

5. A valve according to claim 3, characterized in that the head portion is of a larger diameter than the diameter of the through-bore and that the juncture of the shaft portion and head portion form a head portion shoulder having said piston surface.

6. A valve according to claim 4, characterized in that the outside diameter of the insert is the same as that of the head portion.

7. A valve according to claim 6, characterized in that the insert is a ring and that the inside diameter of the insert is the same as the diameter of the through-bore.

8. A valve according to claim 1, characterized in that the insert comprises a ring surrounding the first connecting bore.

9. A valve according to claim 8, characterized in that the insert front face is smaller than the piston front face.

10. A valve according to claim 8, characterized in that the insert outer diameter is greater than the maximum outer diameter of the piston.

11. A valve according to claim 8, characterized in that the piston chamber is of an axially stepped diameter to have a first diametric bore portion and a reduced diametric portion axially opposite of the front faces from the first diametric portion, that the piston is of a stepped diameter and has a shaft portion axially displaceable in the reduce diameter portion in sealing relationship thereto and a head portion of a larger diameter than the diameter of each of the shaft portion and the outside diameter of the insert and being axially displaceable in the first diametric portion, that the piston has an axial through-bore that is fluidly connected with first connecting bore, that the second connecting bore opens to the first diametric bore portion, and that the inside diameter of the insert is the same as the diameter of the piston bore.

* * * * *